United States Patent Office 2,731,508
Patented Jan. 17, 1956

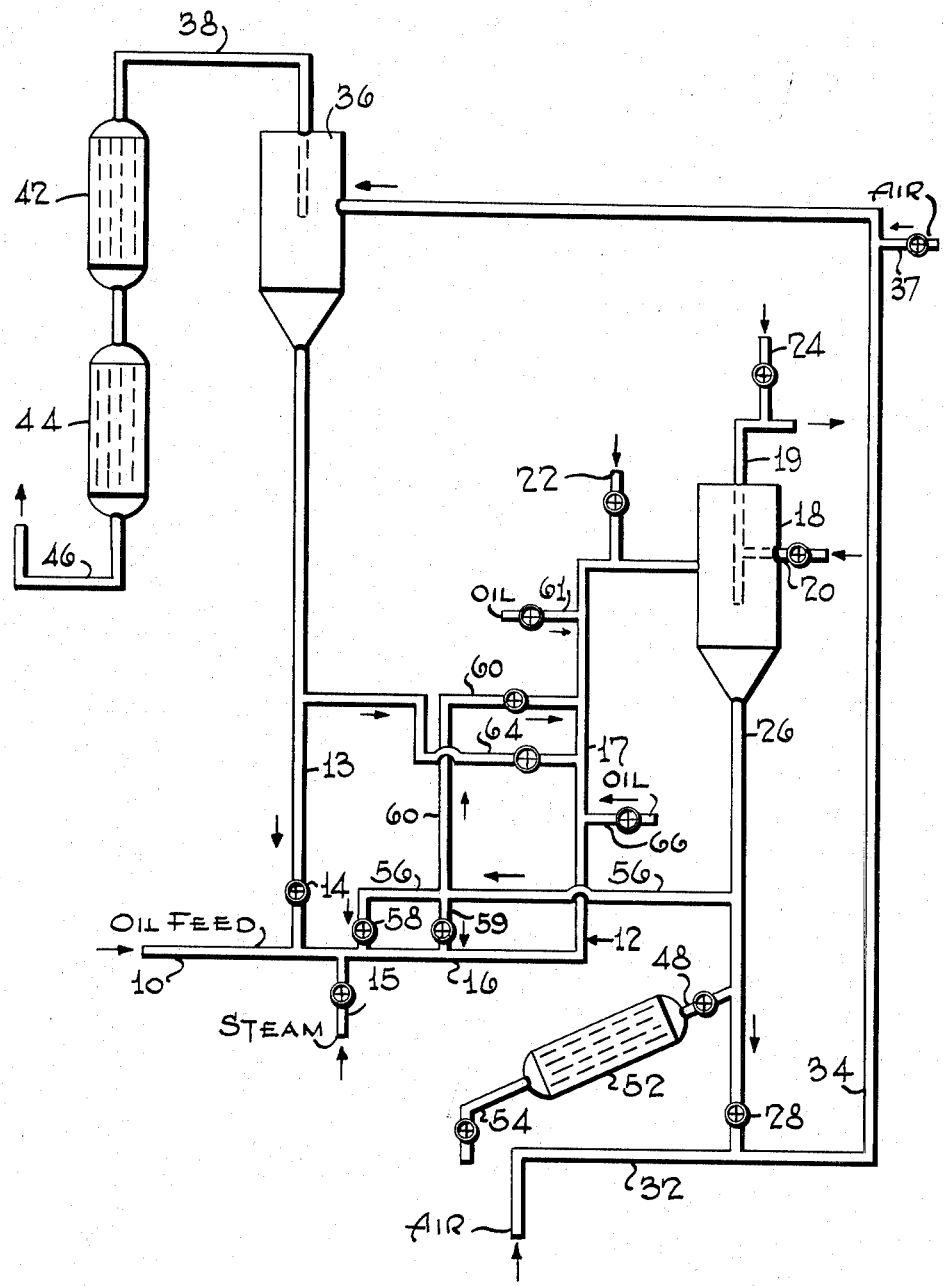

2,731,508

CONVERSION OF HYDROCARBONS FOR THE PRODUCTION OF UNSATURATES AND GASOLINE WITH THE USE OF INERT SOLIDS

Charles E. Jahnig, Red Bank, and James W. Brown, Elizabeth, N. J., assignors to Esso Research and Engineering Company, a corporation of Delaware Application June 8, 1951, Serial No. 230,664

4 Claims. (Cl. 260—683)

This invention relates to the conversion of hydrocarbons and more particularly relates to the high temperature coking of residual hydrocarbon oils for the production of olefins, diolefins and aromatic hydrocarbons.

It is known to crack gas oil, naphtha and hydrocarbon gases at high temperatures for short times to produce olefins, diolefins and aromatic hydrocarbons. In a commercial process, gas oil is heated and cracked in a furnace but the best conditions cannot be realized in this commercial process because as the contact time is reduced the surface for the heat input decreases and the heat flux is already high due to the high heat of reaction. This limits the minimum attainable contact time at high temperatures, and results in temperature gradients over the cross section of the heating tube which lowers selectivity. Moreover there are high pressure and temperature gradients as the oil flows through the furnace heating tube both of which have been found to reduce selectivity. In the commercial process the oil feed is a relatively clean gas oil so that coking in the furnace coil or heating elements is minimized.

According to the present invention residual hydrocarbon oils regardless of their fouling tendency are used as the feed stock. The residual oil may have a gravity of about minus 10 to 30° API, a Conradson carbon of about 5 to 35 wt. per cent and an initial boiling point of 900° F. or higher. The residual hydrocarbon oil may be reduced crude oil, tar, pitch, heavy cycle stocks and the like which are converted to olefins, diolefins and aromatic hydrocarbons by mixing preheated residual oil feed with inert or substantially inert finely divided solid heated to a temperature above reaction temperature. The resulting mixture of residual oil and solid particles is passed through a relatively short tubular reactor or transfer line reactor so that the hydrocarbon oil is subjected to a high temperature for a short time to produce the desired products. The reaction product vapors are separated from the solids containing coke and may then be quenched to minimize further reaction. Some or all of the coke is burned to provide heat for the solids which are recycled to the conversion or cracking step. The heater or burner for heating the solids also comprises a tubular member or transfer line burner and the heated solids are removed from the combustion gases and returned to the conversion zone.

In the present case the residual oil is heated to reaction temperature very quickly by the introduction of the heated solids and the reaction time is controlled by the velocity of the mixture passing through the tubular reactor. In the present process, conditions of heating and time of heating may be varied as desired without changing the equipment and in this way the process is exceedingly flexible. Other modifications are possible as will be hereinafter described.

In the drawing the figure represents one form of apparatus adapted to carry out the process of the present invention.

Referring now to the drawing, reference character 10 designates a line for conducting the residual oil feed to the tubular or transfer line reactor 12. The reduced residual oil may comprise reduced crude oil, tar, pitch, heavy cycle stocks and the like which contain constituents unvaporizable at ordinary pressures without decomposition. Standpipe 13 provided with control valve 14 is provided for introducing highly heated finely divided solids into line 10 for quickly heating the residual oil feed to reaction temperature. The finely divided solids may be coke particles generated in the process or extraneous solids such as coke, silica, clay, spent cracking catalyst, sand or the like. Preferably, the inert or substantially inert solids are of a porous structure to facilitate the conversion operation. The particles are preferably of a size between about 35 and 100 standard mesh and this size will generally be satisfactory as regards freedom from sticking, ease of recovery and attrition.

Also introduced into the inlet end of the reactor 12 is steam introduced through line 15. The reactor 12 may have a horizontal section 16 and a vertical section 17 through which the oil to be converted and solids are passed. The residual oil is preferably heated to a temperature of about 1200° to 1600° F. during its passage through the reactor 12 and the length of the reactor is such as to give a contact time between the oil being cracked and the solids of about 0.2 seconds to 10 seconds at 1200° F., or about 0.1 to 1.0 second at 1600° F. The pressure in the reactor 12 is between about atmospheric and 100 lbs. per square inch, preferably 10–50 lbs./sq. in., but subatmospheric pressures may be used, if desired. The superficial velocity of the oil passing through the reactor 12 may be between about 10 and 100 feet per second, and the concentration of solids in the oil undergoing conversion may be between about 0.5 and 20 lbs. per cubic foot within the reactor 12. There is extremely intimate contact between the solid particles and the oil due to the highly turbulent condition of the mixture passing through reactor 12.

The vaporous reaction products are introduced into a gas-solids separating device such as a cyclone separator 18 for separating the solids from the reaction products. The reaction products are preferably quenched in the outlet line 19 as soon as the solid particles are separated from the reaction products. That is, the quenching medium which may be oil, gas or water is introduced into the inlet end of the discharge line 19 associated with the cyclone separator 18. The quench line is shown at 20. If desired, the quench medium may be introduced into the outlet end of the reactor 12 through line 22 or in the outlet line 19 as shown at 24 but the preferred point of quenching is from line 20 as above described. The vaporous reaction products are quenched to a temperature of about 500° F. to 1000° F.

The separated finely divided soils are passed into standpipe 26 provided with a control valve 28 and are picked up by air or other oxidizing gas introduced through line 32. The resulting suspension is passed through tubular heater or burner 34 which is a high velocity transfer line heater or burner which comprises a vertical tube discharging into a gas-solids separator such as a cyclone separator 36 for separating the heated solids from the combustion gases.

If desired, the air may be added at two or more points of line 34. For example, a part of the air may be added through line 32 to lift the solids to an elevated point in heater 34 and then the rest and most of the air is added through line 37 to insure burning of the combustible material to $CO_2$ to obtain maximum heating. The combustion gases pass overhead through line 38 and the separated solids are passed into the standpipe 13 above referred to.

The superficial velocity of the gases passing through transfer line heater 34 may be between about 10 and 100 feet per second and the concentration of the solids and gases fed to the heater 34 may be between about .03 to 5 lbs. per cu. ft. The pressure in heater 34 may be between about atmospheric and 50 lbs. per sq. in., preferably 1 to 2 lbs. per sq. in. gage. Due to slippage of the solids in the gas in the heater and the vapors in the reactor, the concentration in the heater and reactor will be higher than that of the mixture fed to the heater and reactor, respectively. The mixture in heater 34 is maintained in a highly turbulent condition and extremely intimate contact is obtained between the hot gases and the solids so that the heat exchange between the gases and solids is exceedingly fast.

During passage through the heater or burner 34 some of the coke produced during the process is burned and this heats the solid particles to a temperature above the desired reaction temperature so that when the separated solids are mixed with the residual oil feed they supply the heat of conversion thereto. In cases where sand or clay are used as the inert material, coke will be deposited on these particles and this coke will be partially or totally burned from the clay or sand particles in passage through the heater or burner 34. During burning the temperature in burner 34 may be between about 1000° F. and 1800° F.

The hot combustion gases leaving the cyclone separator 36 through line 38 are at an elevated temperature and in order to recover heat therefrom the gases are passed through a waste heat boiler 42 and then through a water preheater 44 before being passed through line 46 to the stack.

Where coke is used as the finely divided solid, additional coke is formed during the process and some of this coke may be removed from the process through line 48 communicating with standpipe 26 and the hot coke particles are passed through cooler 52 and then recovered from line 54. From line 54 the coke particles may be sent to storage or may be used as fuel in the plant. Solids can also be recycled from the product cyclone separator 18 back to the reactor inlet through line 56 having a valve 58 in order to increase the solids loading or to decrease the temperature drop through the reactor. Also by recycling solids from line 56 to the reactor 12 any pitch or residue on the solids is further cracked.

Instead of introducing all of the recycle solids into the inlet line of the reactor 12 as shown in the drawing some of the recycle solids may be introduced at one or more intermediate points as at 59 or at one or more points as at 60 near the outlet of the reactor 12. This allows operating the reactor with a higher temperature zone near the inlet, whereby it becomes possible to feed refractory stocks such as heavy product from catalytic cracking or coking to the inlet section of the reactor, while more easily cracked feed components are added at a later point or points to give the proper reaction temperature and contact time. Thus, additional feed may be added at one or more points such as 61 and hot solids at points 56, 59 and 60.

It will be seen that this represents a particularly advantageous combination of steps in that one portion of the oil feed may be cracked in the initial section of the reaction zone at high temperature to produce olefinic products, while additional oil fed through line 61, for example, may be cracked in a later section of the reaction zone at lower temperature to produce gasoline or cracking feed stock, the combined products being sent to a common product recovery system. The addition of oil feed through line 61 also acts as a quench. For example, the initial section of the reaction zone may operate at 1300°–1400° F. and 1 second contact time while the second or later section of the reaction zone may operate at 1000°–1100° F. and 1 second contact time, the combination giving light olefins in high concentration and at a very low increment cost. The temperature in the initial section of the reaction zone may be between about 1300° F. and 1600° F. and in the later section between 950° F. and 1200° F.

It is noteworthy that the quenching provided by secondary feed addition in this combination makes it possible to attain very short contact times in the initial reactor section at 1600° F. or higher, which would ordinarily not be practical. Thus, if the stream from the high temperature section were passed directly to a cyclone and then quenched, the minimum attainable contact time would be about 0.5 second due to the limitations of cyclone construction. Moreover, the cyclone would be subjected to severe operating conditions. On the other hand, it has ordinarily been impractical to consider quenching ahead of the cyclone, since this would result in a very large increase in heat load which would render the entire process uneconomic and unattractive.

Heated solids from standpipe 13 may be introduced at one or more intermediate points as for example through line 64 or near the end of the reactor 12 to supply additional heat to the oil undergoing cracking. Especially is this addition of hot solids through line 64 desirable when additional oil is fed through line 66 at one or more intermediate points into the reactor 12. In one form of the invention the oil fed through line 10 into the initial section of the reactor 12 is a highly refractory stock such as cycle oil or the so-called clarified oil from catalytic cracking which will require high temperatures such as 1300°–1600° F. for cracking. Then a less refractory oil such as residual oil or other oil is used as a quench oil introduced into an intermediate section of the reactor through line 66 to reduce the temperature to about 950°–1200° F. and, if desired, additional hot solids from standpipe 13 are introduced into an intermediate section of the reactor 12 through line 64 which is located down stream from line 66.

Instead of adding different feeds at the intermediate points above-mentioned, different portions of the same feed may be introduced into the reactor 12 at one or more intermediate points.

Higher reaction temperatures are easily obtained in the present process simply by increasing the circulation rate of the hot solids.

The following table compares the conditions used in the commercial furnace design with the present transfer line process using finely divided solids.

|  | Commercial | Transfer Line Cracking |
| --- | --- | --- |
| Temperature, ° F.: |  |  |
| In | 775 | 1,355 |
| Out | 1,375 | 1,260 |
| Pressure, p. s. i. g.: |  |  |
| In | 70 | 15 |
| Out | 10 | 14 |

The commercial unit is designed for certain conditions and these are substantially fixed, depending upon the design and construction of the unit. However, in the present process the contact time in the transfer line reactor 12 can be reduced to almost any value since it is not limited by the rate of heating and also higher temperatures can be obtained by increasing the rate of solids circulation or by heating the solids to a higher temperature whereas with a furnace in the commercial unit the heating surface becomes more and more expensive as the temperature is increased. Also equipment for the apparatus shown in the present case can be made of lined carbon steel compared to more expensive alloy tubes required for the furnace in the commercial unit.

The specific details for one design of apparatus for the present invention will now be given.

The amount of oil feed passing through line 10 is about 6700 barrels per operating day and this oil has an API gravity of 5° and an initial boiling point of about 1100° F.

and a Conradson carbon of about 10 wt. percent. In the specific example, the oil feed will be preheated to about 840° F. The amount of steam at a temperature of about 350° F. introduced through line 15 is about 20,500 lbs. per hour. Standpipe 13 is about 100 feet high and has an internal diameter of about 18 inches. The slide valve 14 has an opening of about 10 square inches.

The hot solids which in this case comprise coke having a particle size of 35–100 mesh are at a temperature of about 1500° F. A sufficient amount of solids is passed into the inlet of reactor 12 to heat the residual oil feed to a temperature of about 1355° F. and the pressure is about 16 lbs. per square inch gage. The reactor 12 has an internal diameter of about 56 inches and is about 35 feet long. The superficial velocity of the oil vapors passing through the reactor 12 is about 35 feet per second and the density of the mixture fed to reactor 12 is about 0.43 lbs. per cubic foot.

The reaction products leave the reactor 12 at a temperature of about 1260° F. and under a pressure of about 15 lbs. per square inch and are separated from the solids in the cyclone separator 18. A quench comprising 16,000 lbs./hr. of water is introduced through line 20 into the outlet line 19 of the cyclone separator 18 for reducing the temperature of the reaction products to about 1000° F.

Standpipe 26 is about 25 feet high and 18" in internal diameter. The slide valve 28 in the standpipe 26 has an opening of about 10 square inches.

About 28,000 cubic feet per minute of air at about 80° F. are passed through line 32 and mixed with the coked particles discharged from standpipe 26. Part of the coke on the particles is burned to raise the temperature of the solid particles to about 1500° F. The burner or heater 34 has an internal diameter of about 75 inches and a length of about 25 feet, after the point of final major air addition through line 37. The superficial velocity of the gas passing through the heater 34 is about 50 feet per second and the loading of the solids in the mixture fed to heater 34 is about 0.16 lbs. per cubic foot. The coke circulation in the present design is about 7.5 tons per minute. The transfer line reaction zone 12 and transfer line heater 34 will be about the same length, but are not so shown in the diagrammatic showing in the drawing.

The combustion gases passing through waste heat boiler 42 have their temperature reduced from about 1500° F. to 600° F. and then further reduced to 300° F. by passing through the water preheater 44. The water preheater may be omitted.

A starting up auxiliary burner may be provided for line 32 for heating inert solids introduced into the heating zone 34 from standpipe 26 and the solids may be circulated through the system until the system is heated up to combustion temperature at which time the introduction of fuel to the auxiliary burner is stopped and the feeding of residual oil to the reactor 12 is started.

The capacity of the above design will give about 280,000 lbs. per operating day of ethylene.

What is claimed is:

1. The process of converting heavy petroleum oil to lower boiling hydrocarbons which comprises feeding said oil into contact with a rapidly flowing reaction stream of finely divided solid products which are substantially inert and are preheated to a temperature sufficiently high to raise the temperature of the oil to at least 1200° F., maintaining a contact time of 0.1 to 10 seconds to produce high temperature reaction products including substantial proportions of low molecular weight olefinic hydrocarbons, introducing a second stream of oil feed into the reaction stream after the aforesaid contacting in sufficient quantity to substantially reduce the reaction temperature to a range between about 950° and 1200° F. to quench conversion and degradation of said low molecular weight olefinic hydrocarbons and also to initiate conversion of said second stream to products including substantial proportions of hydrocarbons boiling in the gasoline boiling range, introducing additional hot solid particles into said reaction stream to maintain a conversion temperature within the range last specified, separating the reaction products from said solids and continuously reheating and recycling at least a portion of said solid particles to maintain continuous operation in both stages.

2. Process according to claim 1 wherein the solid particles are finely divided coke products produced in the process.

3. Process according to claim 1 wherein the high temperature olefinic hydrocarbon products comprise ethylene.

4. Process according to claim 1 wherein the second stream of oil is a less refractory hydrocarbon oil than the first mentioned oil.

References Cited in the file of this patent

UNITED STATES PATENTS

| | | |
|---|---|---|
| 2,356,697 | Rial | Apr. 22, 1944 |
| 2,387,798 | Kubicek et al. | Oct. 30, 1945 |
| 2,429,161 | Hudson | Oct. 14, 1947 |
| 2,448,922 | Simpson et al. | Sept. 7, 1948 |
| 2,471,104 | Gohr | May 24, 1949 |
| 2,561,334 | Bowles et al. | July 24, 1951 |
| 2,608,526 | Rex | Aug. 26, 1952 |